United States Patent

Reitan et al.

[15] 3,697,773
[45] Oct. 10, 1972

[54] METHOD AND APPARATUS FOR NON-OSCILLATORY REMOVAL OF TRANSIENTS IN MINIMUM TIME BY BANG-BANG CONTROL OF REACTANCE IN A POWER SYSTEM

[72] Inventors: Daniel K. Reitan, Madison, Wis.; Ramarao Nagavarapu, Warangal, India

[73] Assignee: Wisconsin Alumni Research Foundation, Madison, Wis.

[ * ] Notice: The portion of the term of this patent subsequent to Feb. 9, 1987, has been disclaimed.

[22] Filed: Jan. 11, 1971

[21] Appl. No.: 105,353

Related U.S. Application Data

[63] Continuation-in-part of Ser. No. 848,463, Aug. 8, 1969, abandoned.

[52] U.S. Cl. .......................307/93, 317/50, 317/23, 307/43, 307/85
[51] Int. Cl. .............................................H02h 1/04
[58] Field of Search..........307/11, 43, 85, 86, 87, 56, 307/57, 93; 317/22, 23, 26, 49, 50

[56] References Cited

UNITED STATES PATENTS

3,529,174   9/1970   Smith ..........................307/43

Primary Examiner—Herman J. Hohauser
Attorney—Burmeister, Palmatier & Hamby

[57] ABSTRACT

In a power transmission system involving parallel tie-lines extending between a generating station and a large power grid, transients are removed, upon the opening of one tie-line, by inserting two capacitors in series with the system for a first time interval. The capacitors produce a first capacitive reactance of a sufficiently high value to provide a negative power transmission characteristic so that there is a reverse flow of power between the grid and the generating station. In this way the inertia of the generators at the generating station is accelerated toward an increased power angle in accordance with the decreased power transmission characteristic due to the opening of the one tie-line. After the first time interval, one of the capacitors is short-circuited so as to reduce the capacitive reactance to a second lower value. In this way a positive power transmission characteristic is produced of a greater magnitude than the characteristic in the absence of capacitive reactance. Thus, the inertia of the generators at the generating station is decelerated. After a second time interval, both capacitors are short-circuited to remove all capacitive reactance from the circuit. The time intervals are such as to attain the increased power angle (which is the steady state operating angle under post-fault conditions) which equalizes the energies representing acceleration and deceleration so as to obviate any oscillations. Instead of using the high value of capacitive reactance during the first time interval, an inductive reactance may be employed, which provides a reduced power transmission characteristic so that acceleration of the generating station is produced. The invention is also applicable to other transitions in which it is desirable to prevent oscillation of the power angle of the generating system. When the second tie-line is brought back into service, the power angle may be reduced without oscillation, by switching in a relatively low value of capacitive reactance for a first time interval, so as to increase the power transmission characteristic. During a second time interval, the power transmission characteristic is reduced or reversed by switching in an inductive reactance or a high value of capacitive reactance. If the electrical load on the generating station increases abruptly, the power angle can be increased the necessary amount without oscillation by switching in a high value of capacitive reactance, or an inductive reactance, for a first time interval, following which a lower value of capacitive reactance is switched in for a second time interval. Likewise, an abrupt decrease in load can be accommodated by switching in a relatively low value of capacitive reactance for a first time interval, following which a higher value of capacitive reactance, or an inductive reactance, is switched in for a second interval. In each case, maximum acceleration is followed by maximum deceleration, or vice versa, to bring about the transition in minimum time, without oscillation.

32 Claims, 16 Drawing Figures

INVENTORS
Daniel K. Reitan
RamaRao Nagavarapu
by Burmeister Palmatier
and Hamby
Attys

METHOD AND APPARATUS FOR NON-OSCILLATORY REMOVAL OF TRANSIENTS IN MINIMUM TIME BY BANG-BANG CONTROL OF REACTANCE IN A POWER SYSTEM

This application is a continuation-in-part of our copending application, Ser. No. 848,463, filed Aug. 8, 1969, now abandoned.

This invention deals with the problem of removing or preventing transients in a power system, caused by various disturbances, such as the opening of a transmission line or tie-line, the reclosure of the tie-line, an abrupt increase in the load, or an abrupt decrease in the load.

A related problem is dealt with in our copending application, Ser. No. 826,452, filed May 21, 1969, now U.S. Pat. No. 3,562,544, issued Feb. 9, 1971, on Method and Apparatus for Bang-Bang Control of Reactance to Restore Stability in Minimum Time in a Power System Involving Tie-Lines. Such copending application deals specifically with the problem of restoring stability after the momentary opening and subsequent reclosing of a tie-line which forms the sole connection between a generating station and the rest of the power grid.

In one aspect, the present invention deals with a somewhat different situation in which a generating station is connected to the rest of the power system by two or more parallel tie-lines. In such a situation, transients will be produced in the system if one of the tie-lines is opened, due to some fault therein, so that the remaining power line or lines must carry all of the power flowing between the generating station and the rest of the power grid.

In this regard, it is one object of the present invention to remove or prevent such transients which would otherwise occur upon the opening of one of the parallel tie-lines.

In accordance with this aspect of the invention, such transients are removed or prevented by a method involving the initial step of inserting a capacitive reactance in series with the generating station and the tie-lines, immediately upon the opening of one of the tie-lines. The capacitive reactance is sufficient to produce a negative power transmission characteristic, so that a reverse flow of power occurs between the main part of the power system or grid and the power generating station, resulting in accelerating power at the generating station. Such power accelerates the inertia of the generators at the generating station so that the power angle at the station is advanced or increased. After a first time interval, normally amounting to only a small fraction of a second, the capacitive reactance is decreased to a lower value so that a positive power transmission characteristic is produced. Preferably, the amplitude of the positive power transmission characteristic is the same as that of the negative power transmission characteristic. In general both of these amplitudes can be different. The difference between the shaft power input and the electrical power transmitted from the generating station decelerates the inertia of the generators at the power generating station. After a second time interval, the entire capacitive reactance is removed or reduced to zero. The first and second time intervals are such as to increase the power angle of the generating station, in accordance with the decreased power transmission characteristic due to the loss of one of the tie-lines. Moreover, the time intervals are such as to equalize the energy representing acceleration during the first time interval and the energy representing deceleration during the second time interval. In this way, any oscillation is obviated. Thus, the power angle is increased to the necessary extent to reach the post-transient steady state angle in a deadbeat manner, without producing any transients.

The first and second values of the capacitive reactance may be produced by utilizing two capacitors in series. The high value of the capacitive reactance, needed initially, is produced by connecting both capacitors in series between the generating station and the tie-lines, or at any other suitable location in the system. The lower value of the capacitive reactance may be produced by short-circuiting one of the capacitors. When both capacitors are to be removed from the line, the other capacitor is also short-circuited. Circuit breakers may be employed to short-circuit the capacitors. The first and second time intervals may be determined by utilizing a computer capable of solving the basic equations of the power system as will be explained presently. In this way, these time intervals can be determined for any level of power transmission or load condition.

As an alternative, the present invention contemplates the use of an inductive reactance, instead of the high value of capacitive reactance, to be connected in series with the generating station, immediately upon the opening of one of the tie-lines. The inductive reactance decreases the power of transmission characteristic of the remaining tie-line, so that a reduced amount of power is transmitted over the tie-line from the generating station. With the electrical load thus reduced, there is an acceleration of the inertia of the generating station, with the result that the power angle is increased. After a first time interval, the inductive reactance is short-circuited or otherwise removed from the system, and a capacitive reactance is connected in series with the remaining tie-line, so that a positive power transmission characteristic of a great magnitude is produced. As a result, increased power is transmitted over the tie-line from the generating station, to such an extent that the inertia of the generating station is decelerated. After a second time interval, the capacitive reactance is short-circuited or otherwise removed from the system. The first and second time intervals are regulated so that the power angle is increased to the target value, to compensate for the reduced power transmission characteristic due to the opening of one of the tie-lines. The timing is also such that the inertia of the generating station is returned to its steady state value, so that there is no remaining deviation in the frequency or angular velocity of the generating station.

The method and apparatus of the present invention may also be applied to other transitions involving abrupt changes in the power system, such as to call upon the generating station to change its power angle in a deadbeat, nonoscillatory manner, and in minimum time. Such transitions include abrupt increases or decreases in the electrical load upon the generating station. When the load increases abruptly, the power angle must be increased. This may be brought about by making two successive changes in the reactance in series with the generating station. The first change in reactance is of such a character as to cause acceleration of the inertia of the generating station. The second change in reactance causes deceleration so as to bring the inertia back to its initial value, while maintaining an increase in the power angle. To accomplish the transition in minimum time, the changes in reactance should be as large as may be feasible, consistent with various constraining factors, such as the desire to limit the momentary deviation in the frequency. Another constraining factor is the desire to limit the maximum flow of power into or out of the generating station. Acceleration of the inertia of the generating station may be produced by switching in an inductive reactance, so as to reduce the power transmission characteristic, or by switching in a relatively high value of capacitive reactance, so as to produce a negative power transmission characteristic. Deceleration of the inertia may be produced by switching in a lower value of capacitive reactance, so as to produce an increased positive power transmission characteristic. By regulating the switching times, it is possible to use the same reactance changes to achieve the desired change in the power angle in a nonoscillatory fashion, for a wide range of power levels.

When the electrical load on the generating station is reduced abruptly, it is necessary to reduce the power angle. This may be done in a deadbeat fashion by changing the series reactance for a first interval, so as to cause deceleration of the inertia of the generating station, following which the reactance is again changed so as to accelerate the inertia during a second time interval. It will be evident that this procedure is the reverse of the procedure employed when the load is increased abruptly.

Further objects, advantages and features of the present invention will appear from the following description taken with the accompanying drawings, in which.

Figure 1:
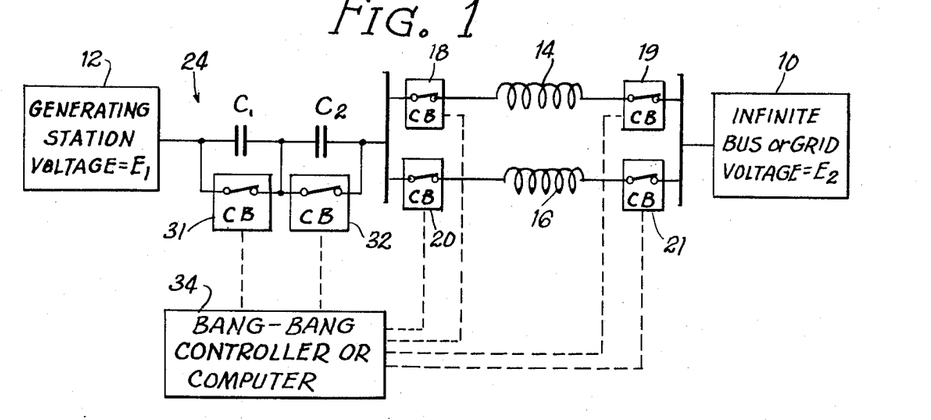
FIG. 1 is a diagrammatic representation of a power transmission system involving parallel tie-lines and incorporating a control system constituting an illustrative embodiment of the present invention.

The power transmission system of FIG. 1 comprises a very large power grid 10 which may be regarded as an infinite bus for purposes of analysis. A generating station 12 is connected to the grid 10 by means of two or more parallel tie-lines 14 and 16. The generating station 12 may comprise one or more generators, operating in parallel, or a group of generating stations, or even a regional power grid. For the purpose of discussion and analysis, the generating station may be regarded as a single equivalent generator, supplying power to the grid 10 through the tie-lines 14 and 16. While two tie-lines are shown, this invention is fully applicable to a system involving more than two parallel tie-lines. In certain aspects, the invention is applicable to a power system generally, regardless of the number of tie-lines.

In accordance with the usual practice, the tie-lines 14 and 16 are protected by circuit breakers at both ends. Thus, circuit breakers 18 and 19 are connected into the opposite ends of the tie-line 14, while breakers 20 and 21 are connected into the opposite ends of tie-line 16.

A control system 24 is connected in series with the generating station 12 and the tie-lines 14 and 16 to remove or prevent transients in the event that one of the tie-lines is opened due to the development of a fault therein. As shown, the control system 24 comprises first and second capacitors $C_1$ and $C_2$, connected in series between the generating station 12 and tie-lines 14 and 16. The capacitors are employed to provide different values of capacitive reactance to prevent transients during a transitional phase following the opening of one of the tie-lines. During normal, steady-state operations, the capacitors $C_1$ and $C_2$ are short-circuited by circuit breakers 31 and 32. It will be seen that the circuit breakers 31 and 32 are controlled by a computer or controller 34, which is also connected to the circuit breakers 18–21, in series with the tie-lines 14 and 16.

Figures 2A, 2B:
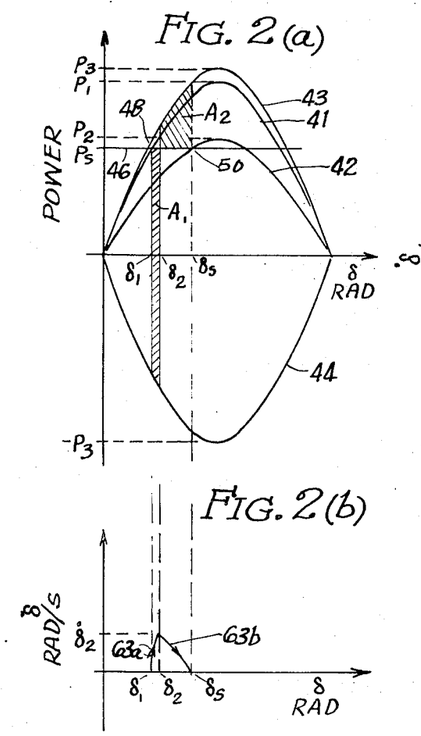
FIG. 2(a) is a set of graphs showing the power transmission characteristics of the tie-lines under various operating conditions.
FIG. 2(b) is a graph, associated with the graphs of FIG. 2(a), and showing a typical trajectory, produced by the method of the present invention, in which the first derivative of the power angle is plotted against the power angle.

FIGS. 2(a) and 2(b) illustrate the action which occurs when one of the tie-lines 14 or 16 is opened due to the development of a fault therein. Such fault may be caused by lightning or any other factor which produces a ground or a short-circuit in the tie-line. Any such fault results in the opening of the associated circuit breakers, connected in series with the tie-line. Thus, the tie-line 14 is protected by the circuit breakers 18 and 19, which will open if any fault is developed in the tie-line 14. Similarly, the circuit breakers 20 and 21 will open if any fault is developed in the tie-line 16.

FIG. 2(a) shows the power transmission characteristics of the tie-lines 14 and 16 under various conditions. In the graphs of FIG. 2(a), the transmitted power P is plotted against the power angle $\delta$ of the generating station 12. The power angle is the angle between the voltage vector at the transmitting station 12 and the voltage vector at the infinite bus or grid 10. It will be seen that FIG. 2(a) shows four characteristic curves 41, 42, 43 and 44 representing four different operating conditions.

The first curve or graph 41 represents the initial or normal power transmission characteristic of the combined tie-lines 14 and 16, operated in parallel. In normal operation, the generating station 12 produces power at a constant level $P_s$, determined by the mechanical or shaft power supplied to the generator or generators at the generating station. In FIG. 2(a) a load line 46 is extended from the shaft power level $P_s$. The initial operating point is at the first intersection 48 between the load line 46 and the first characteristic curve 41. There is a second intersection between the load line 46 and the curve 41 at a higher value of the power angle, but this intersection represents an unstable operating condition which is not used in normal operation.

The peak power of the initial characteristic curve 41 is designated $P_1$. This represents the combined transmission characteristic of the tie-lines 14 and 16. If one of the tie-lines is opened, the power transmission characteristic is reduced, as represented by the second characteristic curve 42, which is smaller than the initial characteristic curve 41. The peak power of the second curve 42 is designated $P_2$. As long as the peak power $P_2$ is greater than the shaft power $P_s$, the remaining tie-line or lines can transmit the shaft power $P_s$, but at a greater power angle, designated $\delta_s$ in FIG. 2(a). This new operating point is at the first intersection 50 between the load line 46 and the second characteristic curve 42. This new operating point 50 is a steady-state operating point under post-fault condition i.e., when one of the tie-lines is opened.

In accordance with the present invention, it is possible to bring about the transition between the initial operating point 48 and the new steady-state operating point 50 in minimum time and without any oscillation, so that the transition is accomplished without producing any transients. In the absence of the present invention, the transition is accompanied by oscillation because there is an over-swing in the power angle before the system settles down at the new operating point. Such over-swings may also lead to instability. Even in those cases wherein the system may loose stability because of over-swings, it is possible because of the present invention, to bring about a transition of the system to the new operating point 50, which otherwise may be an unstable point, in such a way that the system will remain in stable equilibrium at this operating point 50.

In accordance with the present invention, capacitive reactance is inserted between the generating station 12 and the tie-lines, in the event that one of the tie-lines is opened. The capacitive reactance is sufficient to produce a negative power transmission characteristic, as represented by the fourth characteristic curve 44. This requires the capacitive reactance to be greater than the inductive reactance of the remaining tie-lines, so that there is a net capacitive reactance in series with the generating station and the infinite bus 10.

In FIG. 2(a) the peak power of the negative characteristic curve 44 is designated as $-P_3$.

The capacitive reactance is preferably provided by the two capacitors $C_1$ and $C_2$, in series between the generating station 12 and the tie-lines. These capacitors can also be located at any other convenient location such as a switching station. Thus, the control computer 34 opens both of the circuit breakers 31 and 32 if the circuit breakers associated with either of the tie-lines 14 and 16 are opened.

The negative power transmission characteristic results in a reverse flow of power over the remaining tie-lines or lines between the grid 10 and the generating station 12, so that the equivalent generator is driven as a motor and thus is accelerated. The accelerating power is represented in FIG. 2(a) by the distance between the load line 46 and the negative characteristic curve 44 at the power angle $\delta_1$.

The capacitive reactance is kept in the circuit for a first time interval until the power angle is increased to the value $\delta_2$, as shown in FIG. 2(a). The capacitive reactance is then reduced to a lower value, such as to produce the third characteristic curve 43 in FIG. 2(a). This curve represents a greater power transmission characteristic than the second characteristic curve 42, which would prevail in the absence of any capacitive reactance. Preferably the characteristic curve 43 is also equal to or greater than the initial characteristic curve 41 representing the power transmission capability of the combined tie-lines.

At the power angle $\delta_2$, the operating point jumps from the negative characteristic curve 44 to the positive characteristic curve 43 and proceeds along such curve for a second time interval until the power angle reaches the target value $\delta_s$. During the second time interval, the inertia of the generators at the generating station 12 is decelerated, because the transmitted power, represented by the curve 43, exceeds the shaft power $P_s$. The control computer 34 determines the first and second time intervals so that the energy representing deceleration of the inertia at the generating station during the second time interval is the same as the energy representing acceleration during the first time interval. Thus, the velocity deviation at the generating station 12 is the same at the target value $\delta_s$ of the power angle as it was at the initial power angle $\delta_i$. The value of this velocity deviation at these two angles, namely at $\delta_1$ and $\delta_s$ is zero.

In FIG. 2(a), the shaded area $A_1$ represents increased energy due to acceleration of the inertia of the generation station 12 during the first time interval, while the shaded area $A_2$ represents decreased energy due to deceleration during the second time interval. The control computer 34 regulates these time intervals so that the shaded areas $A_1$ and $A_2$ are equal. The area $A_1$ is between the load line 46 and the negative characteristic curve 44. This area extends between the initial power angle $\delta_1$ and the increased power angle $\delta_2$. The shaded area $A_2$ is between the load line 46 and the upper characteristic curve 43. This area extends between the power angle $\delta_2$ and the target angle $\delta_s$.

The peak power of the characteristic curve 43 is designated $P_3$ in FIG. 2(a) and is preferably the same in amplitude as the peak power of the negative characteristic curve 44. In general, these two peak values can be different. It can be shown mathematically that this type of control process minimizes the total time required to make the transition between the initial power angle and the target angle $\delta_s$.

At the target angle $\delta_s$, the capacitive reactance is removed from the system, so that the operating point jumps from the upper characteristic curve 43 to the new or post-transient steady-state operating point 50 on the characteristic curve 42. The system continues to operate at this point in a stable manner since its velocity deviation is zero. There is no oscillation of the system.

In FIG. 2(b) the first derivative $\dot{\delta}$ of the power angle is plotted against the power angle. The first derivative $\dot{\delta}$ represents the increment of the angular velocity of the inertia at the generating station 12. At the initial power angle $\delta_1$, the first derivative $\dot{\delta}$ is zero. During the first time interval between $\delta_1$ and $\delta_2$, the first derivative increases rapidly to a peak value $\dot{\delta}_2$. The corresponding increase in energy is indicated by the shaded area $A_1$. During the second time interval between $\delta_2$ and the target power angle $\delta_s$, the first derivative decreases to zero. The corresponding decrease in energy is indicated by the shaded area $A_2$.

At the target power angle $\delta_s$, the entire capacitive reactance is removed from the system by short-circuiting both capacitors $C_1$ and $C_2$. The control computer or controller 34 accomplishes this result by closing the circuit breakers 31 and 32.

Figure 3:
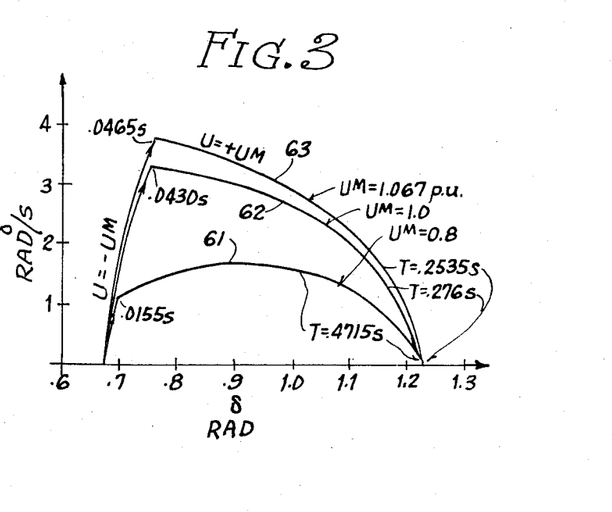
FIG. 3 is a graph similar to FIG. 2(b), but showing a series of trajectories for different values of capacitive reactance, switched in series with the power system in accordance with the invention.

FIG. 3 shows a series of trajectories of the type represented by FIG. 2(b). Three such trajectories, 61, 62 and 63, are shown for three different values of $U^M$, which is the maximum constraining amplitude for the control variable U. Various values may be assigned to $U^M$, depending upon such considerations as the limitation of frequency deviation, for example. The control variable U is the admittance of the power transmission system, such admittance being the reciprocal or inverse function of the system reactance, it being assumed that the system resistance is negligible. The admittance U is expressed in per unit terms, in which the combined admittance of the two tie-lines 14 and 16 is taken as unity. The three different values of $U^M$ are produced by using three different values of $C_1$ and $C_2$ in series. In each case, the initial capacitive reactance is sufficient to produce a negative power transmitting characteristic, while the second value of capacitive reactance is such as to produce a positive characteristic curve having the same peak amplitude as the negative characteristic curve. Each of these trajectories results in minimum time of transfer, for that particular value of $U^M$, but the total time is different for each of the trajectories, the time being decreased as $U^M$ is increased.

In FIG. 3 the total time is indicated for each trajectory. There is also an indication of the first time interval after which the capacitive reactance is reduced to produce a positive characteristic curve.

When $U^M$ is increased, the momentary frequency deviation is also increased, as represented by $\dot{\delta}$ in FIG. 3. The increased frequency deviation may be undesirable in some cases. This is a factor in selecting the value of $U^M$.

The control variable U in FIG. 3 is proportional to the peak power $P_3$, represented in FIG. 2(a). Such peak power is the same in amplitude for the characteristic curves 43 and 44.

It may be helpful to analyze the operation of the bang-bang control system 24 in mathematical terms. With one line open, the system dynamics are described by $$(H/\pi f)(d^2\delta/dt^2) = P_s = E_1 E_2 Y_{12} \sin \delta \qquad (1)$$

where $\delta$ is the power angle, that is, the instantaneous electrical angle in radians from a synchronously revolving reference axis. $E_1$, $E_2$ are the voltages as shown in FIG. 1, in per unit. $Y_{12}$ is the transfer admittance between the generating station 12 and the grid 10, whereas f is the rated frequency. H is the stored energy in megajoules per megavolt-ampere. Letting $x_1 = \delta$, and rewriting equation (1) in state variable form while replacing $Y_{12}$ by U, the control variable, $$\dot{x}_1 = x_2$$

$$\dot{x}_2 = (\pi f/H)(P_s - E_1 E_2 U \sin x_1) \qquad (2)$$

The system is defined by (2). The initial state is given by $x_1(0) = \delta_1$, $x_2(0) = 0$ and the target state by $x_1(T) = \delta_s$ and $x_2(T) = 0$. Optimal control is that control U* from a class of admissible controls which will transfer the system from its initial state to final state in minimum time, subject to the constraint on the control variable $$|U| \leq U^M \qquad (3)$$

where $U^M$ is the maximum value of U, and T is time required to reach target.

By use of Pontryagin's Maximum Principle it can be shown that optimal control is given by $$U^* = U^M \text{ sign}(-n_2) \qquad (4)$$

where the adjoint variables $n_1$ and $n_2$ are given by $$\dot{n}_1 = n_2 (\pi f/H) E_1 E_2 U \cos x_1 \qquad (5)$$

$$\dot{n}_2 = -n_1 1$$

Since the initial and final states of state variables are fixed, the adjoint variables are free at both ends. Equations (2) and (5) along with (4) must be solved. Essentially this is a two-point boundary value problem.

A specific case of $P_1 = 1.0$, $P_2 = 0.667$, $P_s = 0.627$, $H = 3.0$, $U^M = 1.067$, 1.0 and 0.8 is considered. All the above quantities are expressed in the per unit system.

Solution is obtained by means of a fast, repetitive analog computer using a trial and error method to search for the initial values of the adjoint variables. After determining the nature of the switching of the control variable, an accurate solution is obtained by means of a digital computer integrating equation (2) forward in time starting from initial state $\delta_1$ with $U = -U^M$, and integrating equation (5) backwards in time with $U = +U^M$, starting from the final state $\delta_s$. The resulting trajectories 61, 62 and 63 are shown in FIG. 3, along with time in seconds at a few points.

FIGS. 2(a) and 2(b) provide an insight into this optimal control process. When $U = -U^M$, the power characteristic is given by curve 44. Power flows into the machine or generating station from the infinite bus. Area $A_1$ represents acceleration. At an instant corresponding to $\delta_2$, $U$ becomes $+U^M$, so that the power characteristic is transferred to the curve 43. This switching is such that areas $A_1$ and $A_2$ are equal, and $\dot{\delta} = 0$ when $\delta = \delta_s$.

Thus, for a short time interval, $U = -U^M$ (FIG. 3) and the transfer reactance between the generating station 12 and grid 10 is purely capacitive, achieved by opening both the circuit breakers 31 and 32, simultaneous with the opening of one line. When $U = +U^M$, the power characteristic is given by curve 43, achieved by closing the circuit breaker 31. Curve 43 is established by the net inductive reactance of one line in service plus the capacitive reactance of $C_2$, such that curve 43 is the exact reverse of curve 44. During the short interval of time when the transfer reactance is purely capacitive, conditions are not abnormal because the voltages $E_1$ and $E_2$ remain fixed but the power flow is reversed.

The requirements of the capacitors are computed as follows:

$$P_3 = E_1 E_2 U^M \quad (6)$$

In the numerical example, $E_1 = E_2 = 300$ KV line to neutral = 1.0 p.u.; 1.0 per unit power = 6750 MVA; per unit reactance = 40 ohms. The two circuits have inductive reactances of 120 ohms and 60 ohms respectively. It is assumed that the line with the high value of reactance is disconnected. Thus $P_2 = (E_1 E_2/1.5) = 0.667$ p.u. If $U = 1.0$ p.u.; $P_3 = 1.0$ p.u. Thus $|X| = P_3/E_1E_2 = 1.0$ p.u. When $X = +1.0$ p.u. capacitor $C_2$ provides $(40-60) = -20$ ohms. Similarly, when $X = -1.0$, capacitors $C_1$ and $C_2$ in series provide $(-40-60) = -100$ ohms of reactance. Thus the first switching consists of switching in 100 ohms of capacitive reactance (opening the circuit breakers 31 and 32), and subsequent switching shorts one capacitor, leaving 20 ohms of capacitive reactance (closing the circuit breaker 31).

FIG. 3 shows the optimal trajectories for three different values of $U^M$. The greater the value of $U^M$ (or $P_3$), the less the time to steer to the target state. It may be clarified that each one of these different trajectories represents minimum time en route for that particular value of $U^M$. A lower limit on $U^M$ can be established as follows: When $U = +U^M$ at $\delta = \delta_2$, a necessary condition for deceleration is $$P_3 \sin \delta_2 \geq P_s \quad (7)$$

Thus a lower limit on $U^M$ from (6) and (7) is given by $$U^M = (P_s/E_1 E_2 \sin \delta_2) \quad (8)$$

To account for a wide variety of load conditions ($P_s$), it is advantageous to choose $P_3$ approximately equal to or greater than $P_1$. Lower values of $U^M$ correspond to more desirable longer time intervals during which the breakers 31 and 32 are open. Higher values of $U^M$ are associated with larger values of $\delta$ and would require breakers of impractical operating speeds. This brings out some of the factors that govern the choice of $U^M$. Once $U^M$ is properly chosen, this control process is applicable for all load conditions. The minimum time associated with each set of initial and target states (one set for each loading) will be different.

With knowledge of pre-transient steady states and desired post-transient target states, obtained via digital computer computations, this control process can be extended to a large power system.

The basic idea of bang-bang control of reactance is that the line admittance is considered as the control variable which should change its sign at a unique instant of time to reach the target in minimum time. The control process can be summarized as follows. At the instant when one of the two tie-lines is opened by circuit breakers at its both ends, the capacitors $C_1$ and $C_2$ are introduced in series with the power network by opening the circuit breakers 31 and 32. Now the line reactance is purely capacitive, and the power flow is reversed. Power flows into the machine from the infinite bus or grid. The power angle advances as shown by the trajectory 63a in FIG. 2(b). Area $A_1$ in FIG. 2(a) represents acceleration. At an instant corresponding to angle $\delta_2$, the power characteristic is transferred to curve 43 by closing the circuit breaker 31. Curve 43 is established by the net inductive reactance of one line in service diminished by the capacitive reactance of $C_2$, such that curve 43 is an exact reversal of curve 44. The instant of closing the circuit breaker 31, or transferring the power characteristic to curve 43, is such that when the power angle attains a value of $\delta_s$, the target angle, the deviation in angular velocity is zero. This is shown by the trajectory 63b in FIG. 2(b). This condition is also met if the areas $A_1$ and $A_2$ are equal. At the instant of time when the target state is reached, the circuit breaker 32 is closed, removing all capacitances from line and transferring the power characteristic to curve 42, which meets the load demand $P_s$ (previous value) at the new steady-state target angle $\delta_s$.

From a knowledge of the initial state and target state, and equating area $A_1$ and $A_2$, $\delta_2$ can be evaluated from equation (9):

$$\cos \delta_2 = \frac{\frac{P_s}{P_3}(\delta_s - \delta_1) + \cos \delta_1 + \cos \delta_s}{2} \quad (9)$$

where the angles $\delta_s$, $\delta_1$ are in radians.

The computer that controls the capacitor switchings is readily realized. It may be provided with telemetered information about power angles and their derivatives, and information about the initial state of FIG. 2(b). When one line is removed from service, the computer is effective to switch in both the capacitors and also predict the target state rapidly. A fast acting digital computer is readily capable of predicting the target state, or the target state may be known in advance. When this is done, $\delta_2$ is evaluated by use of equation (9). Closing the circuit breaker 31 is brought about at an instant corresponding to the angle $\delta_2$.

Alternatively, the computer is arranged to solve the system and adjoint equations, and to close the circuit breaker 31 at the instant when the control variable changes its sign.

This control process works for all load conditions. Only one set of two capacitors $C_1$ and $C_2$ is required to take care of all load conditions.

This control can also be applied to the case where a fault on one of the two lines is "on" for a short time or there is a time delay before the faulted line is opened.

In summary, the several advantages of the present invention, in this aspect, are: (1) the bang-bang control of reactance is suitable to put into practice and provides for nonoscillatory deadbeat transient removal in minimum time by introducing a unique amount of positive damping, (2) this method is also applicable to the case where the fault is "on" for a normal, short time, (3) a line outage could result from "magnetic storm" direct currents; whereupon the insertion of the bang-bang control series capacitors would provide momentary D.C. blocking for the remaining line in service, if not already provided by steady state series compensating (4) the capacitors need only have a very short time rating and (5) only one set of two capacitors is required to take care of all load conditions.

Figures 4A, 4B:
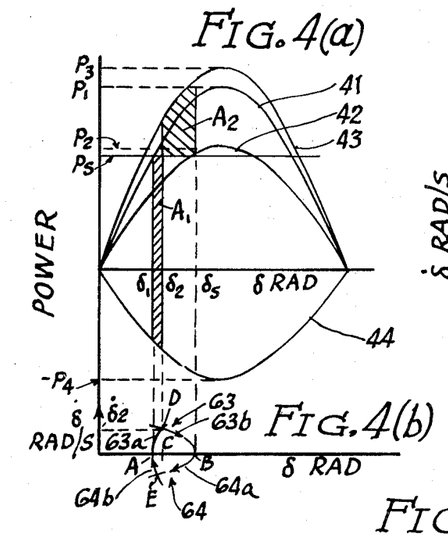
FIG. 4(a) is a set of graphs, similar to FIG. 2(a), but showing the power transmission characteristics of the system when the negative value of the control variable is of less magnitude than the positive value.
FIG. 4(b) is a phase plane graph or diagram, similar to FIG. 2(b), but corresponding to the power transmission characteristics of FIG. 4(a), to show the optimal trajectories which are employed after both the opening and reclosure of one of the tie-lines.

FIGS. 4 (a) and 4 (b) are generalized versions of FIGS. 2 (a) and 2 (b). Insofar as appropriate, the same reference characters are used in FIGS. 4 (a) and 4 (b) as in FIGS. 2 (a) and 2 (b).

FIG. 4 (a) represents generalized power transmission characteristics, which are the same as in FIG. 2 (a), except that the negative power transmission characteristic 44 has a peak amplitude which is different from that of the positive power transmission characteristic 43. This is sometimes advantageous because the smaller negative peak power $-P_4$ results in a longer time interval between the opening of both circuit breakers 31 and 32 and the closing of the circuit breaker 31. As to most commercial circuit breakers, a minimum time is required to reclose the circuit breaker after it has been opened. The use of a reduced negative peak power $-P_4$ may be necessary in order to accommodate the minimum reclosing time of the circuit breaker 31.

In FIG. 4 (b) the trajectory 63 between the initial power angle $\delta_1$ and the target power angle $\delta_s$ is the same as in FIG. 2 (b), except that the time interval involved in the first portion 63a of the trajectory is somewhat greater, due to the smaller value $-P_4$ of the negative characteristic curve 44.

It will be recalled that the trajectory 63 of FIG. 4 (b) represents the manner in which the state of the power system is transferred from the power angle $\delta_1$ to the power angle $\delta_s$, when the tie-line 16 is removed from the system by the opening of the protective circuit breakers 20 and 21, due to some fault in the tie-line 16. FIG. 4 (b) illustrates that the present invention can also be employed to remove transients when the tie-line 16 is again connected into the system by the reclosure of the circuit breakers 20 and 21. With the reclosure of the tie-line 16, the power transmission system is restored into its original capability, so that the original power transmission curve 41 represents the characteristics of the system. It is then necessary to change the state of the system from the power angle $\delta_s$ on the curve 42 to the power angle $\delta_1$ on the curve 41. In accordance with the present invention, this state transfer can be accomplished in a deadbeat, non-oscillatory manner, and in minimum time.

FIG. 4 (b) shows the return trajectory 64, which turns out to be the mirror image of the trajectory 63. Simultaneous with the reclosure of the tie-line 16, the second control circuit breaker 32 is opened, so as to connect the second control capacitor $C_2$ in series with the combined tie-lines 14 and 16. The added capacitive reactance of $C_2$ cancels some of the inductive reactance of the tie-lines, so that the transfer admittance of the transmission system is increased. Such increase produces the characteristic curve 43, which has a higher peak $P_3$ than that of the curve 41, representing the characteristics of the tie-lines 14 and 16 without the use of the capacitors $C_1$ and $C_2$. The increased power, delivered by the generating station 12 to the tie-lines 14 and 16 decelerates the inertia of the generating station, so that the power angle $\delta$ is reduced along the first portion 64a of the trajectory 64. The energy corresponding to this deceleration is represented by the shaded area $A_2$ in FIG. 4 (a).

At the optimal switching time, the first control circuit breaker 31 is opened so that the first control capacitor $C_1$ is connected in series with the second capacitor $C_2$. The increased capacitive reactance cancels all of the inductive reactance of the combined tie-lines 14 and 16 and actually produces a net amount of capacitive reactance, so that the negative power transmission characteristic 44 is produced. This negative characteristic represents power delivered to the generating station 12 by the tie-lines 14 and 16, so that the inertia of the generating station is accelerated. This acceleration is represented by the shaded area $A_1$ in FIG. 4 (a). The power angle $\delta$ is reduced along the second portion 64b of the trajectory 64, until the original power angle $\delta_1$ is reached. At this point, the deviation $\delta$ of angular velocity is zero. Both circuit breakers 31 and 32 are closed to remove both capacitors $C_1$ and $C_2$ from the circuit. The system is then in a condition of stable equilibrium, at the power angle $\delta_1$ on the power characteristic curve 41.

Figure 5:
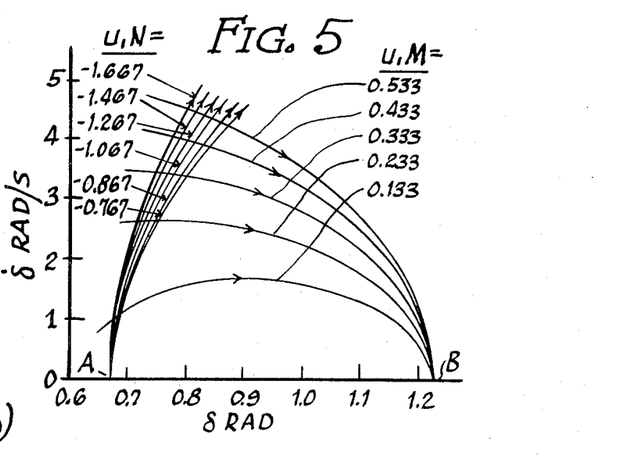
FIG. 5 is a set of phase-plane diagrams, corresponding generally to the upper half of FIG. 4(b).

A slightly modified mathematical analysis will serve as an introduction to FIG. 5, which is a phase plane diagram, showing several trajectories, similar to the trajectory 63 of FIG. 4 (a).

In this analysis, the formulation of the problem is different from that of the previous description. The control variable $u_1$ is added to the $Y_{12}$ term, instead of replacing the $Y_{12}$ term as in Equations (1) and (2). This analysis first deals with the results of synthesis of optimal controllers with a control constraint as discussed previously. As will be seen, this leads to the concept of implementing the bang-bang control process by an inductor and a capacitor.

Rewriting Equations (2) and retaining the term $Y_{12}$, Equation (2) can be rewritten in the following form, retaining the line admittance term $Y_{12}$, rather than $U$:

$$\dot{x}_1 = x_2$$

$$\dot{x}_2 = (\pi f_0/H)(P_s - E_1 E_2 Y_{12} \sin x_1)/(1 + x_2/w_0) \quad (10)$$

It is to be noted that $$x_2 = \dot{\delta} = 2\pi(\Delta f) \quad (10a)$$

where $\Delta f$ is the deviation of the frequency, $f$, from its nominal value of $f_0$. The symbol $w_0$ represents the angular velocity.

Instead of replacing $Y_{12}$ with $U$, let the control variable be $u_1$, added to the line admittance term $Y_{12}$. Accordingly Equation (10) is rewritten as $$\dot{x}_1 = x_2$$

$$\dot{x}_2 = (\pi f_o/H)[P_s - E_1 E_2(Y_{12} + u_1)\sin x_1]/(1 + x_2/w_o) \quad (11)$$

As before, the initial conditions are given by $$x_1(t^o) = \delta_1 = 0.6777 \text{ radian}$$

$$x_2(t^o) = 0 \quad (12)$$

$t^o$ is taken as zero hereafter. Under the conditions of one line opening, the final conditions are given by $$x_1(t^f) = \delta_s = 1.2227 \text{ radians}$$

$$x_2(t^f) = 0 \quad (13)$$

The initial and final states are given by the states A and B in the phase-plane portrait of FIG. 5. The control variable is constrained to lie within a convex set defined by $$u_1^N \leq u_1 \leq u_1^M$$

where $u_1^M$ is positive and $u_1^N$ is negative.
Considering the time-optimal control problem by applying Pontryagin's maximum Principle, the Hamiltonian is given by $$H = n_1 x_2 + n_2 (\pi f_o/H)[P_s - E_1 E_2(Y_{12} + u_1)\sin x_1]/(1 + x_2/w_o) \quad (14)$$

The adjoint variables are given by $$\dot{n}_1 = -(\delta H/\delta x_1) = +n_2(\pi f_o/H)E_1 E_2(Y_{12} + u_1)\cos x_1/(1 + x_2/w_o)$$

$$\dot{n}_2 = -(\delta H/\delta x_2) = -n_1 + n_2(\pi f_o/H w_o)[P_s - E_1 E_2(Y_{12} + u_1)\sin x_1]/(1 + x_2/w_o)^2 \quad (15)$$

Maximizing the Hamiltonian with respect to the control variable $u_1$, optimal control $u_{1\,opt}$ is given by $$u_{1\,opt} = u_1^M \text{ if sign }(-n_2 \sin x_1) > 0$$

$$u_1^N \text{ if sign }(-n_2 \sin x_1) < 0$$

undefined if $(-n_1 \sin x_1) = 0$ \quad (16)

The optimal control is again bang-bang in nature which facilitates the use of forward and backward integration technique in the synthesis of the optimal controllers.

Before indicating the results of the synthesis of optimal controllers, it may be helpful to review the control strategy. FIGS. 4 (a) and 4 (b) are helpful in this regard. The power system is transferred from A to B via the trajectory ADB. This is one of the several possible trajectories: the variation being in the position of D in the phase-plane. Trajectory AD corresponds to acceleration of the inertia and is caused by a net accelerating power as seen from the power characteristic of curve 44. This characteristic is obtained by switching in both the capacitors $C_1$ and $C_2$ and by opening the circuit breakers 31 and 32 simultaneously or in synchronism with the instant of line opening. At an appropriate instant, as governed by the switching function of Eq. (16), circuit breaker 31 is closed removing capacitor $C_1$ and leaving the capacitor $C_2$ in series with the tie-line. This operation would transfer the operating characteristic to curve 43 so that the inertia of the system would decelerate so as to achieve $\dot{\delta} = 0$ when $\delta$ equals $\delta_s$. In other words, the state defined by B is reached At this instant, $C_2$ is removed from the circuit by closing the circuit breaker 32.

Operation on the characteristic 44 from an angle $\delta_1$ to $\delta_2$ or on the trajectory AD from A to D is obtained when the control $u_1 = u_1^N$. Similarly state transfer from D to B and from angle $\delta_2$ to $\delta_s$ on the characteristic 43 is obtained when the control $u_1 = +u_1^M$.

The familiar equal area criterion helps to explain this control strategy. In FIG. 4 (a), area $A_1$ represents acceleration and area $A_2$ deceleration. Equating area $A_1$ to that of area $A_2$, the following equation is an expression for $\delta_2$ at which the control would change from $u_1^N$ to $u_1^M$.

$$\cos \delta_2 = \frac{P_s(\delta_s - \delta_1) + P_3 \cos \delta_s + P_4 \cos \delta_1}{2} \quad (17)$$

where $$P_3 = E_1 E_2(Y_{12} + u_1^M) \quad (18)$$

and $$P_4 = E_1 E_2(Y_{12} + u_1^N) \quad (19)$$

$u_1^M$ is positive and $u_1^N$ is negative. If $P_3 = P_4$, Eq. (17) reduces to $$\cos \delta_2 = \frac{(P_s/P_3)(\delta_s - \delta_1) + \cos \delta_1 + \cos \delta_s}{2} \quad (20)$$

The equations for forward integration along with the initial conditions are given by Eqs. (11) and (12), wherein $u_1^N$ replaces $u_1$. The equations for backward integration are given by $$\dot{z}_1 = -z_2$$

$$\dot{z}_2 = (\pi f_o/H)[P_s - E_1 E_2(Y_{12} + u_1)\sin z_1]/(1 + z_2/w_o) \quad (21)$$

wherein $$u_1 = u_1^M$$

$z_1$ and $z_2$ are same as $x_1$ and $x_2$ of equations (11) but reckoned backwards from the final time. The initial conditions for the above equations are $$z_1(0) = \delta_s = 1.2227 \text{ radians}$$

$$z_2(0) = 0 \quad (22)$$

Equations (22) define the system state at B which is the system state at final time $t^f$. The normal integration of Eqs. (21) corresponds to the backward integration of state Eqs. (11).

The trajectories obtained by forward and backward integration are displayed in FIG. 5. Several trajectories are shown for various values of $u_1^N$ and $u_1^M$. It is to be noted that $u_1^N$ is negative and $u_1^M$ is positive. Tables 1 and 2, set forth below, summarize the pertinent data of some of these trajectories. Table 1 shows the optimal switching time, total time to reach the target state and the value of $\delta$ and $\dot{\delta}$ at the optimal switching time. Optimal switching time, as previously defined, is the time at which the control variable $u_1$ changes from $u_1^N$ to $u_1^M$. Table 2 itemizes the capacitor requirements for various combinations of $u_1^N$ and $u_1^M$. Each one of the trajectories shown in FIG. 5 is an optimal trajectory for that particular constraint on $u_1$ namely: $u_1^N \leq u_1 \leq u_1^M$. In all the trajectories of FIG. 5, it is important to note that $P_4$ is negative.

In Table 1, the last column shows the values of the optimal switching angle obtained by the use of equal area criterion via Eq. (17). These values are in very good agreement with those obtained from the synthesis procedure.

c. For a given value of $u_1^N$, the smaller the value of $u_1^M$ (or the smaller the value of $P_3$), the larger is the value of time to reach the target but the smaller the value of maximum frequency deviation or $\delta$.

d. The smallest value of maximum frequency deviation is 1.63 radians/sec or approximately 0.25 Hz. The corresponding time to reach the target is 0.68 seconds. In this example the value of H is taken as 3.0. Larger values of H will lead to a maximum frequency deviation of less than 0.1 Hz.

TABLE 1.—SUMMARY OF THE DATA OF OPTIMAL CONTROLLERS (WITH TWO CAPACITORS) OF FIG. 5

| $u_1^N$, p.u. | $P_4$, p.u. | $u_1^M$, p.u. | $P_3$, p.u. | Optimal switching time in seconds | Time in seconds to reach target | $\delta$ At the optimal switching time Radians | $\dot{\delta}$ At the optimal switching time Radians/sec. | Optimal switching angle obtained via equal area method, radians |
|---|---|---|---|---|---|---|---|---|
| −1.667 | −1.0 | 0.533 | 1.2 | 0.0558 | 0.2262 | 0.8014 | 4.488 | 0.8017 |
|  |  | 0.333 | 1.0 | 0.0432 | 0.2766 | 0.7508 | 3.424 | 0.7511 |
|  |  | 0.133 | 0.8 | 0.0139 | 0.4719 | 0.6853 | 1.093 | 0.6853 |
| −1.467 | −0.8 | 0.533 | 1.2 | 0.0616 | 0.2293 | 0.8135 | 4.446 | 0.8133 |
|  |  | 0.333 | 1.0 | 0.0478 | 0.2791 | 0.7590 | 3.422 | 0.7589 |
|  |  | 0.133 | 0.8 | 0.0155 | 0.4725 | 0.6862 | 1.101 | 0.6862 |
| −1.267 | −0.6 | 0.533 | 1.2 | 0.0686 | 0.2332 | 0.8273 | 4.396 | 0.8272 |
|  |  | 0.333 | 1.0 | 0.0546 | 0.2820 | 0.7686 | 3.401 | 0.7589 |
|  |  | 0.133 | 0.8 | 0.0176 | 0.4706 | 0.6873 | 1.108 | 0.6862 |
| −1.067 | −0.4 | 0.533 | 1.2 | 0.0775 | 0.2381 | 0.8443 | 4.322 | 0.8444 |
|  |  | 0.333 | 1.0 | 0.0612 | 0.2858 | 0.7807 | 3.393 | 0.7809 |
|  |  | 0.133 | 0.8 | 0.0203 | 0.4748 | 0.6890 | 1.119 | 0.6891 |
| −0.867 | −0.2 | 0.533 | 1.2 | 0.0892 | 0.2448 | 0.8662 | 4.245 | 0.8662 |
|  |  | 0.333 | 1.0 | 0.0709 | 0.2908 | 0.7970 | 3.369 | 0.7970 |
|  |  | 0.133 | 0.8 | 0.0240 | 0.4765 | 0.6913 | 1.134 | 0.6913 |
| −0.767 | −0.1 | 0.533 | 1.2 | 0.0965 | 0.2490 | 0.8793 | 4.189 | 0.8794 |
|  |  | 0.333 | 1.0 | 0.0773 | 0.2942 | 0.8072 | 3.352 | 0.8071 |
|  |  | 0.233 | 0.9 | 0.0607 | 0.3435 | 0.7576 | 2.629 | 0.7574 |

TABLE 2.—CAPACITOR RATINGS IN OHMS AND MICROFARADS OF THE OPTIMAL CONTROLLERS OF FIG. 5

| P.u. | Value of $C_2$ Ohms | Value of $C_2$ Microfarads | $u_1^N = -1.667$ Ohms | $u_1^N = -1.667$ Microfarads | $u_1^N = -1.467$ Ohms | $u_1^N = -1.467$ Microfarads | $u_1^N = -1.267$ Ohms | $u_1^N = -1.267$ Microfarads | $u_1^N = -1.067$ Ohms | $u_1^N = -1.067$ Microfarads | $u_1^N = -0.867$ Ohms | $u_1^N = -0.867$ Microfarads | $u_1^N = -0.767$ Ohms | $u_1^N = -0.767$ Microfarads |
|---|---|---|---|---|---|---|---|---|---|---|---|---|---|---|
| 0.533 | 26.67 | 99.40 | 73.33 | 36.15 | 83.33 | 31.80 | 100.00 | 26.50 | 133.33 | 19.85 | 233.33 | 11.36 | 433.63 | 6.12 |
| 0.433 | 23.64 | 112.00 | 76.36 | 34.70 | 86.36 | 30.70 | 103.03 | 25.65 | 136.36 | 19.42 | 236.36 | 11.20 | 436.36 | 6.08 |
| 0.333 | 20.00 | 132.50 | 80.00 | 33.15 | 90.00 | 29.45 | 106.07 | 24.85 | 140.00 | 18.91 | 240.00 | 11.04 | 440.00 | 6.02 |
| 0.233 | 15.56 | 170.50 | 84.44 | 31.40 | 94.44 | 28.10 | 111.11 | 23.80 | 144.44 | 18.35 | 244.44 | 10.85 | 444.44 | 5.97 |
| 0.133 | 10.00 | 265.00 | 90.00 | 29.45 | 100.00 | 26.50 | 116.67 | 22.70 | 150.00 | 17.65 | 250.00 | 10.60 | 450.00 | 5.89 |

The requirement of capacitive reactances is calculated as follows. As an example consider $u_1^N = -1.267$ p.u. and $u_1^M = +0.333$ p.u. From Eq (18), $P_3 = 1.0$ p.u. since $(Y_{12} + u_1^M)$ equals unity. Thus the net transfer reactance should be 40 ohms. Since the tie-line in service has 60 ohms, 20 ohms of capacitive reactance is to be introduced by switching in $C_2$. Similarly $(Y_{12} + u_1^N) = -0.6$ p.u. Hence $P_4$ from Eq. (19) is −0.6 p.u. A value of net admittance of −0.6 p.u. corresponds to a transfer reactance of −66.67 ohms. Hence both the capacitors should contribute a total reactance of −126.67 ohms. Since $C_2$ has a reactance of −20 ohms, $C_1$ must contribute −106.67 ohms. This is the basis of the results presented in Table 2.

Several conclusions can be drawn from FIG. 5, and Tables 1 and 2.

a. Shorter time intervals to reach the target are accompanied by large values of maximum frequency deviation ($\Delta f$) and $\delta$ and vice versa.

b. For a given value of $u_1^M$, the more negative $u_1^N$ is (or the more negative $P_4$ is), the smaller the time to reach the target and the optimal switching time but the larger the value of maximum frequency deviation or $\delta$.

e. Smaller values of $\Delta f$ are associated with very short values for the optimal switching time. During this time interval, both the capacitors are in series with the system. This implies that breaker 31 is to be closed at the end of this short time interval (both the breakers are opened at the beginning of this interval). This appears to be a disadvantage.

f. Further efforts in lowering this maximum frequency deviation by choosing a value of $u_1^M$ smaller than 0.133 (or $P_3 = 0.8$) would make the optimal switching time extremely small.

g. The maximum frequency deviation and the time to reach the target state are more sensitive to $u_1^M$ than to $u_1^N$.

Figure 6:
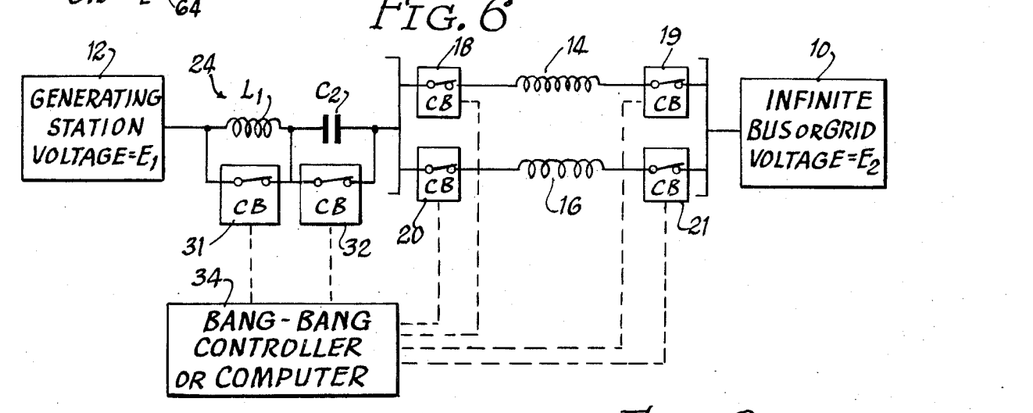
FIG. 6 is a diagrammatic representation of a modified power transmission system utilizing an inductor instead of one of the capacitors of FIG. 1.

FIG. 6 illustrates a modified power system in which the control capacitor $C_1$ of FIG. 1 is replaced with an inductor $L_1$. Thus, the control system of FIG. 6 utilizes the inductor $L_1$ and the capacitor $C_2$ as the control elements. The circuit breakers 31 and 32 are connected across $L_1$ and $C_2$. The bang-bang control system utilizes two successive control intervals. During one interval, the circuit breaker 31 is opened to switch the inductor $L_1$ into the circuit. During the other control interval, the circuit breaker 31 is closed, while the circuit breaker 32 is opened to switch the capacitor $C_2$ into the circuit. The series inductor $L_1$ could be replaced with a shunt inductor, together with switching means for connecting it into the circuit. The same effect as switching $L_1$ in series with the line can be achieved by short-circuiting any conventional series compensating capacitor which may be already provided in the system.

Figure 7:
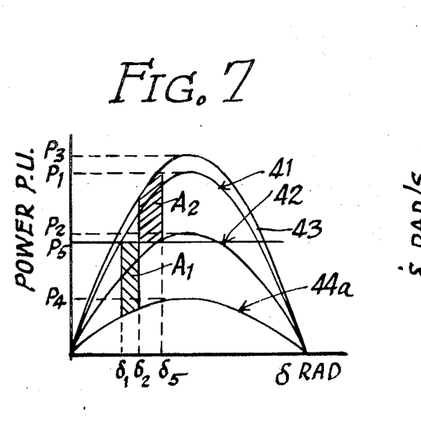
FIG. 7 is a set of power transmission characteristics for the system of FIG. 6.

FIG. 7 comprises a set of power transmission characteristic curves for the modified system of FIG. 6. In FIG. 7, the characteristic curves 41, 42 and 43 are the same as in FIG. 4(a). The curve 44 of FIG. 4(a) is replaced with a curve 44a which is positive, rather than negative as in FIG. 4(a). Thus, the characteristic curve 44a has a peak power $P_4$ which is positive rather than negative.

It will be recalled that the characteristic curve 41 represents the combined transmission capabilities of the tie-lines 14 and 16. The characteristic curve 42 represents the reduced transmission capability when the tie-line 16 is switched out of the system. The effect of switching the inductor $L_1$ in series with the transmission system is to reduce the transmission capability still further, as represented by the characteristic curve 44a of reduced amplitude.

The control strategy when the tie-line 16 is opened, due to some fault in the tie-line, is much the same as before. Initially, the generating station 12 is operating in a state of equilibrium at the power angle $\delta_1$ where the shaft load line $P_s$ intersects the characteristic curve 41. Simultaneously, with the opening of the tie-line 16, the circuit breaker 31 is opened by the control device 34 so as to shift the system to the lower characteristic curve 44a. Due to the reduced loading on the generating station 12, the inertia of the generating station is accelerated along the curve 44a, until the optimal switching angle $\delta_2$ is reached. The circuit breaker 31 is then closed to short-circuit the inductor $L_1$, and simultaneously the circuit breaker 32 is opened to connect the capacitor $C_2$ in series with the line. In this way, the system is shifted to the enhanced characteristic curve 43. The loading on the generating station 12 is now greater than $P_s$, with the result that the inertia of the generating station is decelerated along the curve 43 until the target power angle $P_s$ is reached. The circuit breaker 32 is then closed to remove the capacitor $C_2$ from the system. Accordingly, the system is switch to the equilibrium point where the shaft load line $P_s$ intersects the characteristic curve 42. At this point, the deceleration has compenstated for the acceleration so that the angular velocity is normal. Thus, the velocity deviation $\hat{\delta}$ is zero. The optimal switching time, corresponding to the angle $\delta_2$, is determined by the computer 34 so that the deviation $\hat{\delta}$ is zero at the target $\delta_s$. The switching time is computed in the manner described in FIGS. 4(a), 4(b) and 5.

Figure 8:
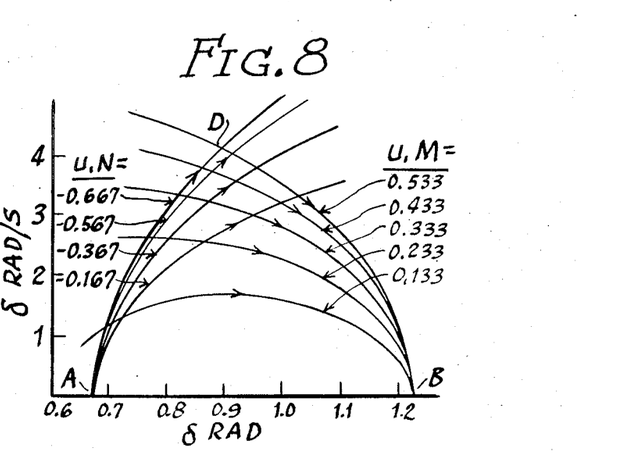
FIG. 8 is a phase-plane diagram showing trajectories of optimal control for the system of FIG. 6.

FIG. 8 comprises a series of phase-plane diagrams, similar to those of FIG. 5, but representing various values of inductive reactants for the system of FIG. 6. FIG. 8 shows various trajectories ADB for different values of the control variables $U_1^M$ and $u_1^N$. The values of $u_1^M$, attributable to various values of $C_2$, are the same as in FIG. 5. However, the values of $u_1^N$ are smaller, ranging from $-0.667$ to $-0.167$. The corresponding values of $P_4$ range from zero to 0.5 p.u. Each value of $P_4$ simply represents the algebraic sum of $P_2$, which is assumed to be 0.667, and the corresponding value of $u_1^N$. It will be noted that the trajectories in FIG. 8 have portions AD that are less steep than the corresponding portions in FIG. 5.

In FIG. 7, the shaded area $A_1$ represents the energy of acceleration, while the shaded area $A_2$ represents the energy of deceleration. These shaded areas are of equal magnitude. From this relationship of equality, the optimal switching angle $\delta_2$ can be calculated by the following formula:

$$\delta_2 = \cos^{-1} \frac{P_s(\delta_s - \delta_1) + P_3 \cos \delta_s - P_4 \cos \delta_1}{(P_3 - P_4)} \quad (23)$$

The optimal switching angles and the corresponding optimal switching times are preferably calculated by means of forward and backward integration of the state equations, as before. The trajectories of FIG. 8 are obtained in this manner. The pertinent numerical results obtained from these trajectories are summarized in Tables 3 and 4 set forth below. In Table 3 the last column lists the values of the optimal switching angle obtained by the use of equal area relationship, by means of Equation (23). These values are in excellent agreement with those obtained by forward and backward integration.

In FIG. 8 the trajectory corresponding to $u_1^N$ equals $-0.667$ is of interest, because the corresponding value of $P_4$ is zero, which is the case for zero power transfer. This situation implies that the inductive reactance of $L_1$ is infinite, which must be interpreted as meaning that the circuit has been opened. Such opening of the remaining tie-line 14 can be produced intentionally, or may result from a three phase fault at the sending end of the tie-line. The other values of $u_1^N$ are normally produced by providing different values of inductive reactance, but they may be interpreted as resulting from other types of faults on the line.

It will be seen from Table 3 that the maximum frequency deviation, corresponding to $\hat{\delta}$, and the time required to reach the target are highly sensitive to the value of $u_1^M$. It can also be seen that the optimal switching times are considerably greater than those given in Table 1 above. Each of these figures represents the time interval during which the inductive reactance is in series with the system. The circuit breaker 31 is opened at the time of this interval and is closed at the end thereof. The longer time intervals are advantageous because they can be handled by commercially available circuit breakers.

Table 2 shows the values of the capacitor $C_2$ and the inductor $L_1$ for different values of the control variables $u_1^M$ and $u_1^N$. These component values are of economic interest because the cost of the components $C_2$ and $L_1$ is determined by the values of capacitants and inductive reactance which must be provided. In any particular control situation, there are three main factors which must be weighed in selecting the control variables. These factors are the cost of components $C_2$ and $L_1$, the importance of minimizing the time required for the state transfer, and the permissible frequency deviation corresponding to the maximum value of $\hat{\delta}$, at the point D in the trajectory.

TABLE 3.—SUMMARY OF THE DATA OF OPTIMAL CONTROLLERS (WITH ONE CAPACITOR AND ONE REACTOR) OF FIG. 8

| $u_1^N$, p.u. | $P_4$, p.u. | $u_1^M$, p.u. | $P_3$, p.u. | Optimal switching time in seconds | Time in seconds to reach target | $\delta$ At the optimal switching time Radians | $\dot{\delta}$ At the optimal switching time Radians/ sec. | Optimal switching angle via equal area method, radians |
|---|---|---|---|---|---|---|---|---|
| −0.667 | 0 | 0.533 | 1.2 | 0.1051 | 0.2539 | 0.8945 | 4.119 | 0.8946 |
|  |  | 0.333 | 1.0 | 0.0848 | 0.2981 | 0.8192 | 3.329 | 0.8192 |
|  |  | 0.133 | 0.8 | 0.0294 | 0.4788 | 0.6948 | 1.155 | 0.6947 |
| −0.567 | 0.1 | 0.533 | 1.2 | 0.1155 | 0.2599 | 0.9125 | 4.033 | 0.9123 |
|  |  | 0.333 | 1.0 | 0.0941 | 0.3030 | 0.8338 | 3.299 | 0.8337 |
|  |  | 0.133 | 0.8 | 0.0331 | 0.4805 | 0.6970 | 1.167 | 0.6971 |
| −0.367 | 0.3 | 0.533 | 1.2 | 0.1447 | 0.2773 | 0.9583 | 3.784 | 0.9584 |
|  |  | 0.333 | 1.0 | 0.1206 | 0.3170 | 0.8744 | 3.202 | 0.8742 |
|  |  | 0.133 | 0.8 | 0.0443 | 0.4852 | 0.7048 | 1.218 | 0.7047 |
| −0.167 | 0.5 | 0.533 | 1.3 | 0.1956 | 0.3086 | 1.0280 | 3.322 | 1.0281 |
|  |  | 0.333 | 1.0 | 0.1693 | 0.3432 | 0.9438 | 2.974 | 0.9439 |
|  |  | 0.133 | 0.8 | 0.0677 | 0.4946 | 0.7225 | 1.305 | 0.7223 |

TABLE 4

Capacitor and Reactor Ratings (in ohms) of the Optimal Controllers of FIG. 8

| $u_1^M$ p.u. | Value of $C_2$ in ohms | Value of $C_2$ in microfarads | $u_1^N$ p.u. | Value of series inductor $L_1$ in ohms |
|---|---|---|---|---|
| 0.533 | 26.67 | 99.4 | −0.667 | Infinite |
| 0.433 | 23.64 | 112.0 | −0.567 | 340.0 |
| 0.333 | 20.00 | 132.5 | −0.367 | 73.3 |
| 0.233 | 15.56 | 170.5 | −0.167 | 20.0 |
| 0.133 | 10.00 | 265.0 |  |  |

It has already been indicated in connection with FIGS. 4(a) and 4(b) that the bang-bang control of the present invention is applicable to tie-line reclosure, when the tie-line 16, which was previously opened, is again closed. With one tie-line 14 in service, the system is operating at the state B, corresponding to the power angle $\delta_s$ in FIG. 4(b). When the previously opened tie-line 16 is now to be reclosed the system must be transferred to the state A, corresponding to the power angle $\delta_1$, which is a state of equilibrium on the curve 41. Two distinct approaches are available for this reciprocal state transfer from B to A. One approach involves reclosing the line 16 first, and then transferring the system from state B to state A. The other approach involves transferring the state of the system first, and then reclosing the tie-line 16, when $\delta = \delta_1$ and $\dot{\delta} = 0$. In both cases the problems are similar to those already discussed. The same mathematical formulations may be employed.

Figure 9:
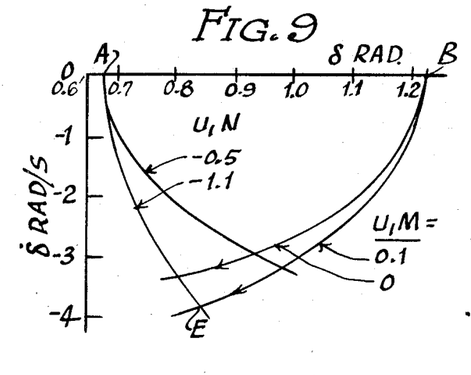
FIG. 9 is a phase-plane diagram showing trajectories for a state transfer of the power system following reclosure of a tie-line.

FIG. 9 comprises phase-plane diagrams or trajectories representing the first approach in which the reclosure of the tie-line 16 is followed by the transfer of the state of the system.

Simultaneously with the tie-line reclosing, the capacitor $C_2$ is switched in by opening the circuit breaker 32, to change the operating characteristic to curve 43. Operation on this curve decelerates the inertias of the system. The phase-plane trajectory is shown by BE of FIGS. 4(a) and 9. During this operation, the optimal control $u_1$ opt $= u_1^M$, a positive quantity. At the optimal switching time corresponding to the angle $\delta_2$ or state E in the phase-plane portraits of FIG. 4(b) and 9, the control is changed to $u_1^N$, a negative quantity, changing the system operation to curve 44 of FIG. 4(a) or curve 44a of FIG. 7. The former corresponds to the control process using two capacitors $C_1$ and $C_2$, and the latter to that using one capacitor $C_2$ and an inductor $L_1$. In the first case, an additional capacitor $C_1$ is switched in by opening the circuit breaker 31. In the second case, the reactor $L_1$ of FIG. 6 is switched in, and the capacitor $C_2$ is switched out. Operation along curve 44 accelerates the system inertia and is denoted by the trajectory EA of FIG. 4(b). The optimal switching time is such that when $\delta = \delta_1$, $\dot{\delta} = 0$. Hence the system is in equilibrium at state A. This can also be explained by the statement that areas $A_2$ and $A_1$ in FIGS. 4(b) and 7 should be equal. Using the equal area criterion, the optimal switching angle $\delta_2$ may be computed, as previously described. Thus, it is apparent that the value of $\delta_2$ will be the same, and the phase-plane trajectory will be an exact mirror-image of that for the state transfer from A to B, if the same power characteristics given by curves 43 and 44 are used in the state transfers from A to B and from B to A.

The optimal trajectories calculated by using the technique of forward and backward integration are shown in FIG. 9. In this figure, the state transfer from B to A is shown. Since both the tie-lines are in service, $Y_{12} = 1.0$ p.u. When $u_1^M = 0.1$ p.u., $P_3$ equals 1.1 p.u.; and when $u_1^M = 0.0$, $P_3$ equals 1.0 p.u. In FIGS. 5 and 8, when $P_3$ equals 1.1 p.u. and 1.0 p.u., the corresponding values of $u_1^M$ are 0.433 p.u. and 0.333 p.u., respectively, since $Y_{12}$ equals 0.667 p.u. Referring to FIG. 9, the trajectory corresponding to $u_1^N = -1.1$ p.u. refers to the case of $P_4 = -0.1$ p.u. In other words, the control process uses two capacitors. When $u_1^N = -0.5$, $P_4$ equals +0.5 p.u., implying the control process using an inductor and one capacitor.

In FIG. 9, the case of $u_1^M = 0$ is interesting, because it means that the capacitor $C_2$ is not switched in when the previously opened tie-line is reclosed. The system operates along the power characteristic 41 of FIG. 4(a) or 7, which is the normal power characteristic when both the tie-lines 14 and 16 are in service. However, the capacitor $C_1$ or the inductor $L_1$ is introduced into the system at the optimal switching angle in order to reach the target state A. Thus, it should be possible in some cases to transfer the system from state B to A with one controlling element. The important point in this connection is that there will not be any control on the frequency deviation, and the deceleration is governed by the power characteristic 41 and the state B.

Figure 10:
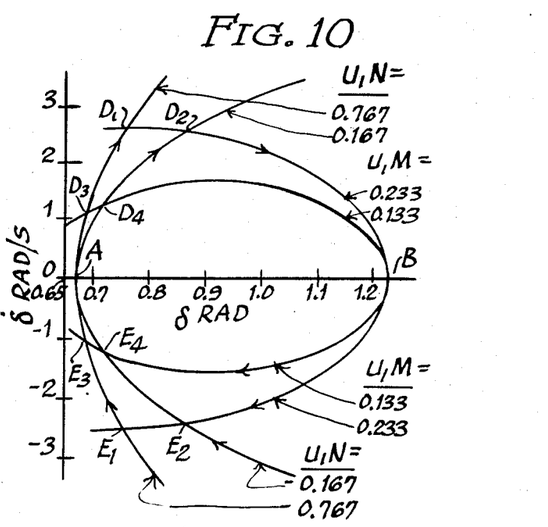
FIG. 10 is another phase-plane diagram showing trajectories for optimal state transfer preceding tie-line reclosure.

FIG. 10 illustrates phase-plane trajectories for the other approach, in which the reclosure of the tie-line is preceded by the state transfer of the system. When it is desired to reclose the previously opened tie-line 16 and put it back into service, the bang-bang control process can be implemented first, in a manner similar to that described above. As soon as state A is reached at which $\delta=\delta_1$ and $\dot\delta=0$, the controlling elements are switched out, and simultaneously the tie-line 16 is switched in. This is the basic idea.

Since there is only one tie-line 14 in operation before the reclosure of the second tie-line 16, the value of $Y_{12}$ is 0.667 p.u. Thus, the value of $u_1^M = 0.333$ p.u. gives a $P_3$ of 1.0 p.u. It is seen that by choosing a proper value of $u_1^M$, $P_3$ can even be made less than 1.0 p.u. This has the advantage that the frequency deviation or $\dot\delta$ will be less than that when $P_3$ is greater than 1.0 p.u. In the case of reclosing the tie-line 16 first, a value of $u_1^M = 0$ gives a value of $P_1$ equals unity, and it is not possible to make $P_1$ less than unity. FIG. 10 shows the phase-plane trajectories for the present case of transferring the state from B to E to A. It also shows the state transfer from A to D to B. Comparing FIGS. 9 and 10, it is easily seen that the frequency deviation or $\dot\delta$ is less in FIG. 10 than that in FIG. 9.

All the numerical results presented thus far relate to the example of the power system model with two tie-lines and a load of 0.627 p.u. There is nothing to restrict this invention to any particular load condition or range of loads. It is valid for all load conditions. If the normal load is not very low, a capacitor and an inductor combination is recommended. If the loads are expected to vary over a wide range, dropping to as low as 0.1 p.u., it may be better to use the control process with two capacitors.

Figure 11:
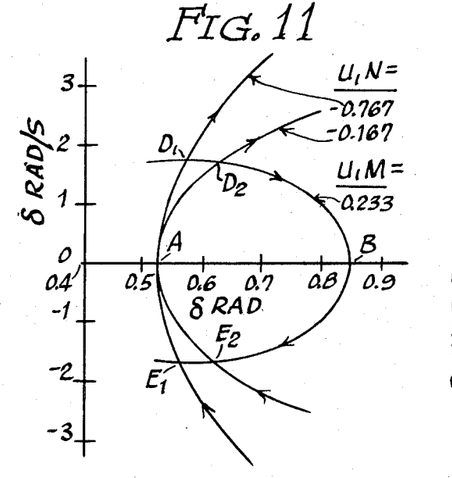
FIG. 11 is a phase plane-diagram, similar to FIG. 10, but showing trajectories for the state transfer when the electrical load is less than in the case of FIG. 10.

FIG. 11 comprises phase-plane diagrams or trajectories illustrating the applicability of this invention to various power levels. The trajectories are similar to those of FIG. 10, in that they represent state transfers from A TO B, following the opening of the tie-line 16, and the return transfers of state, preceding reclosure of the tie-line 16. All the numerical values are the same as before but the load is assumed to be constant at 0.5 p.u., rather than 0.627 p.u., as before. The state equations for forward and backward integration are the same as before. The initial conditions for forward integration, corresponding to the initial state A, are given as follows:

$x_1(0) = \delta_1 = 0.5235$ radian
$x_2(0) = 0$ (24)

The conditions for the final state or target B are as follows:

$x_1(t') = \delta_2 = 0.8474$ radian
$x_2(t') = 0$ (25)

The state transfer trajectories from A to B and from B to A in FIG. 11 represent the results of the forward and backward integration. The trajectories for state transfer from B to A, shown as $BE_1A$ and $BE_2A$ are for the case of tie-line reclosure preceded by transfer of state. Table 5, set forth below, summarizes the pertinent data of the trajectories of FIG. 11. It will be evident that the lower load level is accommodated by changing the optimal switching time.

TABLE 5.—SUMMARY OF THE DATA OF OPTIMAL CONTROLLERS OF FIG. 11 FOR STATE TRANSFER FROM A TO B

| | | | | Optimal switching time in seconds | Time in seconds to reach target | $\delta$ | $\dot\delta$ |
|---|---|---|---|---|---|---|---|
| | | | | | | At the optimal switching time | |
| $u_1^N$, p.u. | $P_4$, p.u. | $u_1^M$, p.u. | $P_3$, p.u. | | | Radians | Radians per sec. |
| −0.767 | −0.1 | 0.233 | 0.9 | 0.0493 | 0.3018 | 0.5654 | 1.7170 |
| −0.167 | +0.5 | 0.233 | 0.9 | 0.1147 | 0.3331 | 0.6241 | 1.7020 |

Figure 12:
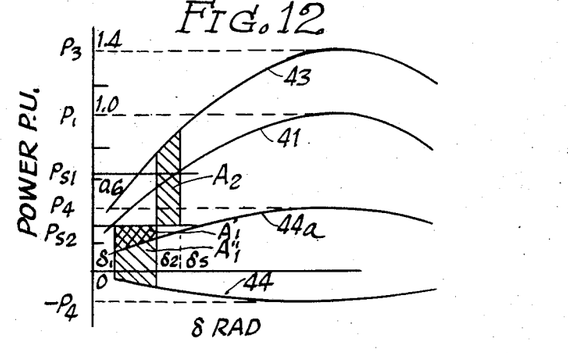
FIG. 12 is a set of power transmission characteristics to illustrate the control strategy for a sudden load increase.

The bang-bang control method of the present invention is also applicable to the removal of transients when there is a sudden decrease or increase in the load upon the generating station 12. The control process is illustrated in FIG. 12, which comprises power transmission characteristic curves similar to FIGS. 4(a) and 7. The curves 41, 43 and 44 of FIG. 12 are the same as the corresponding curves illustrated in FIG. 4(a). The curve 44a of FIG. 12 is the same as illustrated in FIG. 7. It will be understood that the peak amplitudes $P_3$, $P_4$ and $−P_4$ are dependent upon the values of the control variables.

FIG. 12 will serve to illustrate the control strategy when the load on the generating station is suddenly reduced from $P_{s1}$ to $P_{s2}$, represented by corresponding load lines in FIG. 12. The initial operating point is at the intersection of the load line $P_{s1}$ with the curve 41, representing the transmission characteristics of the combined tie-lines 14 and 16. When the load is reduced to $P_{s2}$ the state of the system must be transferred to the final point where the load line $P_{s2}$ intersects the characteristic curve 41. As before, one control variable is employed to produce deceleration, and then the other control variable is utilized to cause acceleration. The acceleration matches the deceleration so that the final power angle is reached with zero deviation in the angular velocity.

In FIG. 12 the initial power level $P_{s1}$ is assumed to be 0.627 p.u., as before, while the final power level $P_{s2}$ is assumed to be 0.3. The power angle $\delta_s$ at $P_{s1}$ is 0.6777 radian as before. At $P_{s2}$, the final power angle is 0.3047 radian.

When the power level drops from $P_{s1}$ to $P_{s2}$, deceleration may be produced by switching in the capacitor $C_2$. This results in the larger characteristic curve 43 having a peak amplitude $P_3$. The generating station 12 is decelerated along the curve 43 between $\delta_s$ and the optimal switching angle $\delta_2$. At the corresponding instant of time, the decelerating control variable is replaced with the accelerating control variable, which may be produced by using either the capacitor $C_1$ or the inductor $L_2$. If the capacitor $C_1$ is used, it is connected in series with $C_2$ to produce the characteristic curve 44, to which the system is switched. If the inductor $L_2$ is used, it is switched in, while the capacitor $C_2$ is switched out, so as to produce the characteristic curve 44a. The accelerating control variable is kept in the system until the final power angle $\delta_1$ is reached, whereupon, the accelerating control variable is switched out. The optimal switching time $\delta_2$ is computed so that the acceleration nullifies the deceleration, so that the net deviation $\dot\delta$ is zero.

In FIG. 12 the area $A_2$ represents the energy of deceleration, which is equal to the energy of acceleration, represented by $A_1'$, in the case of the inductive control variable or $A_1''$ in the case of the capacitive accelerating variable. The area $A_2$ is bounded by the curve 43 and the load line $P_{s2}$, between the power angles $\delta_s$ and $\delta_2$. The area $A_1'$ is bounded by the load line $P_{s2}$ and the curve 44a, between the power angles $\delta_2$ and $\delta_1$. The area $A_1''$ is bounded by the load line $P_{s2}$ and the curve 44, between the angles $\delta_2$ and $\delta_1$.

Figure 13:
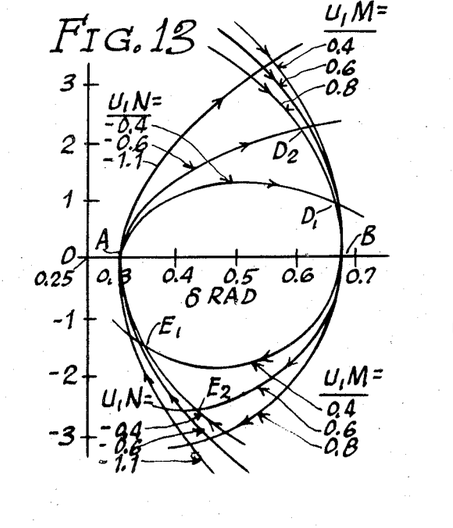
FIG. 13 is a phase-plane diagram showing trajectories of optimal control for sudden load increase and decrease.

FIG. 13 illustrates phase-plane trajectories for the state transfer when the power level is decreased abruptly. Several trajectories $BE_1A$, $BE_2A$ and so forth are shown for different values $u_1^M$ and $u_1^N$ of the control variables. The deceleration variable is represented by $u_1^M$, while the acceleration variable is represented by $u_1^N$.

Figure 14:
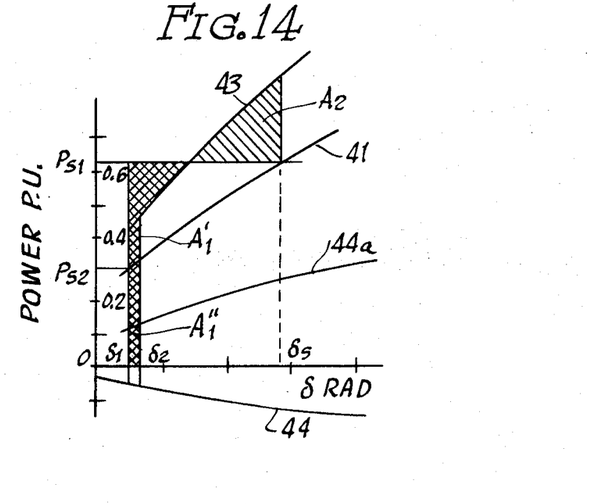
FIG. 14 is a set of power transmission characteristics to illustrate the control strategy for a sudden load increase.

The trajectories of FIG. 13 are computed in the same manner as before. Table 6 summarizes the numerical values involved in the trajectories. The values have been calculated by forward and backward integration of the state equations with verification by the equal area method. The last column in Table 6 indicates the control method as either C—C, in which the acceleration variable is capacitive, or L–C, in which the acceleration variable is inductive.

to $P_{s1}$, the accelerating control variable is switched into the system. If such variable is to be inductive, the circuit breaker 31 is opened to switch in the inductor $L_1$. The operating point is thereby switched to the curve 44a. If the accelerating variable is to be capacitive both $C_1$ and $C_2$ are switched into the system, in which case the operating point shifts to the negative curve 44. At the optimal switching time, $\delta_2$, the switching is changed so that only the capacitor $C_2$ is in series with the tie-lines 14 and 16. The operating point then switches to the curve 43 and proceeds along this curve until the final angle $\delta_s$ is reached. In FIG. 14, the area $A_2$, representing the energy of deceleration is equal to the area $A_1'$, corresponding to the energy of acceleration when the inductive variable is used. When the capacitive variable is used, the area $A_2$ is equal to the area $A_1''$. It will be noted that the area $A_1'$ is bounded by the load line $P_{s1}$ and the curves 44a and 43, while the area $A_1''$ is bounded by the load line $P_{s1}$ and the curves 44 and 43. In each case, a portion of the acceleration is contributed by the portion of the curve 43 which is below the load line $P_{s1}$.

The phase-plane trajectories shown in the upper portion of FIG. 13 are computed in the same manner as before. Table 7 summarizes the data for these trajecto- TABLE 6.—SUMMARY OF THE DATA OF OPTIMAL CONTROLLERS FOR SUDDEN DECREASE OF LOAD (FIG. 13)

| $u_1^M$ | $P_3$ | $u_1^N$ | $P_4$ | Optimal switching time in seconds | Time in seconds to reach the target | $\delta$ At the optimal switching time | $\dot{\delta}$ At the optimal switching time | Optimal switching angle via equal area method | Type of control process |
|---|---|---|---|---|---|---|---|---|---|
| 0.6 | 1.6 | −1.1 | −0.1 | 0.1750 | 0.2372 | 0.3848 | −2.585 | 0.3848 | C-C |
|  |  | −0.6 | 0.4 | 0.1638 | 0.2470 | 0.4138 | −2.589 | 0.4138 | L-C |
|  |  | −0.4 | 0.6 | 0.1566 | 0.2532 | 0.4323 | −2.575 | 0.4325 | L-C |
| 0.4 | 1.4 | −1.1 | −0.1 | 0.2614 | 0.2951 | 0.3283 | −1.398 | 0.3283 | C-C |
|  |  | −0.6 | 0.4 | 0.2538 | 0.3005 | 0.3393 | −1.480 | 0.3395 | L-C |
|  |  | −0.4 | 0.6 | 0.2486 | 0.3040 | 0.3473 | −1.532 | 0.3477 | L-C |

The control method and apparatus of the present invention are also applicable to the removal of transients ries. This Table is arranged in the same manner as Table 6.

TABLE 7.—SUMMARY OF THE DATA OF OPTIMAL CONTROLLERS FOR SUDDEN INCREASE OF LOAD (FIG 13)

| $u_1^M$ | $P_3$ | $C_1$ Ohms | $C_1$ Microfarads | $u_1^N$ | $P_4$ | $C_1$ or $L_1$, ohms | Optimal switching time in seconds | Total time in seconds to reach target | $\delta$ At the optimal switching time Radians | $\dot{\delta}$ At the optimal switching time Radians/sec. | Optimal switching angle via equal area method radians | Type of control process |
|---|---|---|---|---|---|---|---|---|---|---|---|---|
| 0.6 | 1.6 | 15 | 176.5 | −1.1 | −0.1 | −425.0 | 0.1516 | 0.2309 | 0.5448 | 3.200 | 0.5450 | C-C |
|  |  |  |  | −0.6 | 0.4 | 100.0 | 0.0516 | 0.3030 | 0.6198 | 2.196 | 0.6199 | L-C |
|  |  |  |  | −0.4 | 0.6 | 26.67 | 0.0225 | 0.4127 | 0.6664 | 0.998 | 0.6665 | L-C |
| 0.4 | 1.4 | 11.43 | 231.5 | −1.1 | −0.1 | −428.57 | 0.1452 | 0.2394 | 0.5252 | 3.062 | 0.5251 | C-C |
|  |  |  |  | −0.6 | 0.4 | 100.00 | 0.0628 | 0.3087 | 0.6077 | 2.173 | 0.6077 | L-C |
|  |  |  |  | −0.4 | 0.6 | 60.00 | 0.0278 | 0.4151 | 0.6636 | 1.000 | 0.6637 | L-C | when the power level is increased suddenly. FIG. 14 illustrates the control strategy which may be employed, while the upper portion of FIG. 13 shows several possible phase-plane trajectories $AD_1B$, $AD_2B$ and so forth. The characteristic curves shown in FIG. 14 are the same as in FIG. 12. Moreover, the power levels $P_{s1}$, $P_{s2}$ are the same. In this case, the initial operating point is at the intersection of $P_{s2}$ with the characteristic curve 41, representing the transmission capabilities of the combined tie-lines 14 and 16. $P_{s2}$ is assumed to be 0.3 p.u., while $P_{s1}$ is 0.627, as before. The initial power angle $\delta_1$ is 0.3047 radian, while the final power angle $\delta_s$ is 0.6777 radian, as before.

When the power level is suddenly increased from $P_{s2}$

It will be evident that the present invention provides bang-bang control in which first and second control variables are employed during first and second time intervals. The two different control variables change the transfer admittance of the transmission system to two different values, one of which produces acceleration, while the other produces deceleration of the inertia of the generating system. If the desired state transfer requires an increase in the power angle, the acceleration is used first, followed by the deceleration. If the power angle is to be decreased, the deceleration is used first, followed by the acceleration. In either case, the energy of acceleration is equal to the energy of deceleration so that there is no net change in the energy or the angular velocity. Thus, the change in state is achieved without oscillation. For the particular values of the control variables, which have been selected, the state transfer is accomplished in minimum time. The same values of the control variables can be employed for all state transfers, regardless of the power level. Only the optimal switching time and the total transfer time need to be changed. Inasmuch as these time elements can readily be computed and controlled, the bang-bang control system has virtually universal application to achieve state transfers without oscillation and in minimum time.

The following publications are incorporated by reference, as valuable background material:

1. D.K. Reitan and N. RamaRao, "Pontryagin's maximum principle aids transient stability; bang-bang control of reactance, "*Proceedings of the IEEE*, Vol. 56, No. 10, pp. 1734–35, October 1968.

2. N. RamaRao and D.K. Reitan, "Improvements of power system transient stability using optimal control: bang-bang control of reactance," Paper No. 69 T P 645–TWR, IEEE Summer Power Meeting, June 1969.

3. O.J.M. Smith, "Power system transient control by capacitor switching," IEEE Transactions, Vol. PAS–88, No. 1, Jan. 1969.

4. L.S. Pontryagin et al., *The Mathematical Theory of Optimal Control Processes*, Interscience Publishers, 1962.

The control system of the present invention can often be used as an advantageous alternative to the provision of conventional series compensation capacitors, which are expensive because they are in series with the line at all times and thus must be constructed to withstand continuous duty at maximum operating loads. Such series compensation capacitors increase the power transmission capability of the line, so that the stability of the system is improved. However, the control system of the present invention can provide even greater improvement in stability, but at a lower cost, because the control capacitors and inductors are used only intermittently for very brief intervals. Thus, the capacitors and inductors may have much lower ratings as to duty cycles. Accordingly, these components are relatively inexpensive. Even with the necessary switch gear and control equipment, the system of the present invention is considerably less expensive than conventional series compensating capacitors. Nevertheless, the present invention is capable of achieving superior results.

We claim:

1. A method of removing transients in a power transmission system upon the opening of one tie-line of a plurality of tie-lines extending between generating means and a power grid, said method comprising the steps of inserting a first capacitive reactance in series with the generating means and the tie-lines upon the opening of said one tie-line, said first capacitive reactance being of a sufficient value to produce a negative power transmission characteristic and thereby cause reverse power flow between the grid and the generating means so as to cause acceleration of the inertia of the generating means toward an increased power angle as required by the decreased power transmission characteristic due to the opening of said one tie-line, reducing said capacitive reactance after a first time interval to a lower value such as to produce increased electrical loading of the generating means and thereby to produce deceleration of the inertia of the generating means, and removing said capacitive reactance after a second time interval, said time intervals being such as to attain said increased power angle while equalizing the energies of said acceleration and deceleration.

2. A method according to claim 1, in which the lower value of capacitive reactance is such as to produce an increased positive power transmission characteristic relative to the characteristic in the absence of capacitive reactance.

3. A method according to claim 2, in which said negative power transmission characteristic is approximately the same in amplitude as said increased positive power transmission characteristic.

4. A method according to claim 1, in which the said first capacitive reactance is obtained by inserting two capacitors in series with the generating means and the tie-lines, said lower value of capacitive reactance being achieved by removing one of said capacitors.

5. A method according to claim 1, in which said first capacitive reactance is obtained by inserting two capacitors in series with the generating means and the tie-lines, said lower value of capacitive reactance being achieved by short-circuiting one of said capacitors, the removal of the capacitive reactance being achieved by short-circuiting both of said capacitors.

6. Apparatus for removing transients in a power system upon the opening of one tie-line of a plurality of tie-lines extending between generating means and a power grid, said apparatus comprising means providing a first capacitive reactance, means for inserting said first capacitive reactance in series with the generating means and the the tie-lines upon the opening of said one tie-line, said first capacitive reactance being of a sufficient value to produce a negative change in the electrical loading of the generating means and thereby to produce acceleration of the inertia at the generating means toward an increased power angle as required by the decreased power transmission characteristic due to the opening of said one tie-line, means operative after a first time interval for reducing said first capacitive reactance to a second lower value of capacitive reactance such as to produce increased electrical loading of the generating means and thereby to produce deceleration of the inertia of the generating means, and means operative after a second time interval for removing said lower value of capacitive reactance, said time intervals being such as to attain said increased power angle while equalizing the energies of said acceleration and deceleration.

7. Apparatus according to claim 6,
including first and second capacitors,
said first capacitive reactance and said second lower value of capacitive reactance being obtained by switching said first and second capacitors into and out of the circuit between the generating means and the tie-lines.

8. Apparatus according to claim 6,
including first and second capacitors connected in series and constituting said means providing said first capacitive reactance,
and switching means for short-circuiting one of said capacitors and constituting said means for reducing said first capacitive reactance to a second lower value of capacitive reactance.

9. Apparatus according to claim 8, including
switching means for short-circuiting the other capacitor and constituting said means for removing the capacitive reactance from the circuit.

10. Apparatus according to claim 6,
including a computer for regulating said time intervals such that the energies of acceleration and deceleration are equal.

11. Apparatus according to claim 6,
including a controller for regulating said time intervals such that the power angle of the generating means is increased as required by the reduced power transmission characteristic due to the opening of the one tie-line while equalizing the energies of acceleration and deceleration.

12. A method of removing transients in a power transmission system upon the opening of one tie-line of a plurality of tie-lines extending between generating means and a power grid,
said method comprising the steps of inserting a first reactance into the power transmission system for a first time interval upon the opening of said one tie-line to produce acceleration of the inertia of the generating means toward an increased power angle as required by the decreased power transmission characteristic due to the opening of the tie-line,
said first reactance being of such a value as to produce a negative change in the electrical loading of said generating means,
and changing to a second different reactance for a second time interval following said first time interval and thereby producing deceleration of the inertia of the generating means,
said second reactance being such a value as to increase the electrical loading of said generating means,
said time intervals being made such as to attain said increased power angle while equalizing the energies of said acceleration and deceleration.

13. A method according to claim 12,
in which said first reactance is inductive.

14. A method according to claim 12,
in which said first reactance is capacitive.

15. A method according to claim 12,
in which both of said reactances are capacitive, but of different values.

16. A method according to claim 12,
in which said first reactance is capacitive and of a value to produce a negative power transmission characteristic so that power will flow from the grid to the generating means.

17. A method according to claim 12,
in which said second reactance is capacitive and of a value to increase the positive power transmission chacteristic between the generating means and the grid.

18. A method of removing transients while changing the power angle of generating means due to an abrupt change in a power system involving transmission means between the generating means and a power grid,
said method comprising the steps of providing first and second different reactances in the transmission means for first and second successive time intervals,
one of said reactances being such as to produce a negative change in the electrical loading of said generating means and thereby to produce acceleration of the inertia of said generating means,
the other reactance being such as to increase the electrical loading of said generating means and thereby to produce deceleration of the inertia of said generating means,
the sequence of acceleration and deceleration being such as to change the power angle in the required direction,
the first and second time intervals being made such as to attain the required change in the power angle while equalizing the energies of acceleration and deceleration.

19. A method according to claim 18,
in which the change in the power angle is occasioned by a change in the capability of the transmission means.

20. A method according to claim 18,
in which the change in the power angle is occasioned by a change in the load level of the generating means.

21. A method according to claim 18,
in which the change in the power angle is required by a decrease in the capability of the transmission means,
the first and second reactances being such as to produce acceleration during the first time interval and deceleration during the second time interval.

22. A method according to claim 18,
in which the change in the power angle is occasioned by an increase in the capability of the transmission means,
the first and second reactances being such as to produce deceleration during the first time interval and acceleration during the second time interval in the sequence.

23. A method according to claim 18,
in which the change in the power angle is occasioned by a decrease in the load level of the generating means,
the first and second reactances being such as to cause deceleration during the first time interval and acceleration during the second time interval of the sequence.

24. A method according to claim 18,
in which the change in the power angle is occasioned by an increase in the load level of the generating means, the first and the second reactances being such as to cause acceleration during the first time interval and deceleration during the second time interval of the sequence.

25. A method according to claim 18, in which inductive reactance is employed to produce increased acceleration during one of the time intervals.

26. A method according to claim 18, in which capacitive reactance is employed to produce acceleration during one of the time intervals.

27. A method according to claim 18, in which capacitive reactance is employed to produce deceleration during one of the time intervals.

28. Apparatus for removing transients while changing the power angle of generating means in response to an abrupt transition in a power system involving transmission means between the generating means and a power grid, said apparatus comprising first means operative upon the abrupt transition for producing a first reactance in said transmission means during a first time interval, second means for producing a second different reactance in the transmission means during a second time interval following the first time interval, one of said reactances being such as to produce a negative change in the electrical loading of said generating means and thereby to produce acceleration of the inertia of said generating means, the other reactance being such as to increase the electrical loading of said generating means and thereby to produce deceleration of the inertia of said generating means, and a controller including sequencing means for determining the sequence of acceleration and deceleration in accordance with the direction in which the power angle is to be changed as required by the abrupt transition, said controller also including timing means for determining said first and second time intervals so as to attain the required change in power angle while equalizing the energies of acceleration and deceleration.

29. Apparatus according to claim 28, in which the change in the power angle is occasioned by an abrupt decrease in the capability of the transmission means, said sequencing means being constructed and arranged to cause acceleration during said first time interval and deceleration during said second time interval, whereby the power angle is increased while equalizing acceleration and deceleration.

30. Apparatus according to claim 28, in which the change in the power angle is occasioned by an abrupt increase in the capability of the transmission means, said sequencing means being constructed and arranged to produce deceleration during said first time interval and acceleration during said second time interval, whereby the power angle is decreased while equalizing acceleration and deceleration.

31. Apparatus according to claim 28, in which the change in the power angle is occasioned by an abrupt decrease in the power level of the generating means, said sequencing means being constructed and arranged to produce deceleration during the first time interval and acceleration during the second time interval, whereby the power angle is decreased while equalizing acceleration and deceleration.

32. Apparatus according to claim 28, in which the change in the power angle is occasioned by an abrupt increase in the power level of the generating means, said sequencing means being constructed and arranged to produce acceleration during the first time interval and deceleration during the second time interval, whereby the power angle is increased while equalizing acceleration and deceleration.

* * * * *

PO-1050
(5/69)

UNITED STATES PATENT OFFICE
CERTIFICATE OF CORRECTION

Patent No. 3,697,773      Dated   October 10, 1972

Inventor(s)   Daniel K. Reitan and Ramarao Nagavarapu

It is certified that error appears in the above-identified patent and that said Letters Patent are hereby corrected as shown below:

Column 11, line 56, "into" should read --to--.

Equation (17) should be corrected to read as follows:

$$\cos \delta_2 = \frac{P_s (\delta_s - \delta_1) + P_3 \cos \delta_s + P_4 \cos \delta_1}{P_3 + P_4}$$

Column 22, line 47, "$P_{52}$" should read -- $P_{s2}$ --.

Signed and sealed this 13th day of March 1973.

(SEAL)
Attest:

EDWARD M. FLETCHER, JR.
Attesting Officer

ROBERT GOTTSCHALK
Commissioner of Patents